United States Patent [19]

Sheets et al.

[11] Patent Number: 5,444,307
[45] Date of Patent: Aug. 22, 1995

[54] WIPER-ACTIVATED HEADLIGHT CIRCUIT

[75] Inventors: Allen R. Sheets; Donald Parks, both of Danville, Va.

[73] Assignee: Sheets Electronics, Inc., Danville, Va.

[21] Appl. No.: 87,449

[22] Filed: Jul. 9, 1993

[51] Int. Cl.⁶ .................. H01H 47/24; B60Q 1/02; B60L 1/14
[52] U.S. Cl. .................. 307/10.8; 307/10.1; 315/82; 315/77; 361/175
[58] Field of Search .......... 315/82, 83, 77, 80; 307/10.1, 10.8; 361/173, 175; 362/61, 80, 253, 802, 276

[56] References Cited

U.S. PATENT DOCUMENTS

| | | | |
|---|---|---|---|
| 4,339,667 | 7/1982 | Bergmann et al. | 307/10 CS |
| 4,713,584 | 12/1987 | Jean | 315/83 |
| 5,130,905 | 7/1992 | Ruter | 362/61 |
| 5,138,183 | 8/1992 | Patterson | 307/10.8 |
| 5,235,250 | 8/1993 | Cronk | 315/82 |

*Primary Examiner*—Thomas M. Dougherty
*Assistant Examiner*—Aditya Krishnan
*Attorney, Agent, or Firm*—Rhodes, Coats & Bennett

[57] ABSTRACT

A relay circuit connects the headlight circuit and wiper circuit of a motor vehicle to actuate the low-beam lamps whenever the windshield wipers are activated. The relay circuit includes a delay circuit to permit continuous operation of the headlights even during intermittent operation of the windshield wipers, and an interlock to prevent operation to prevent the low beams and high beams from being simultaneously operated. Further, the relay circuit includes means to prevent operation of the vehicles instrument lights as a warning to the operator.

10 Claims, 2 Drawing Sheets

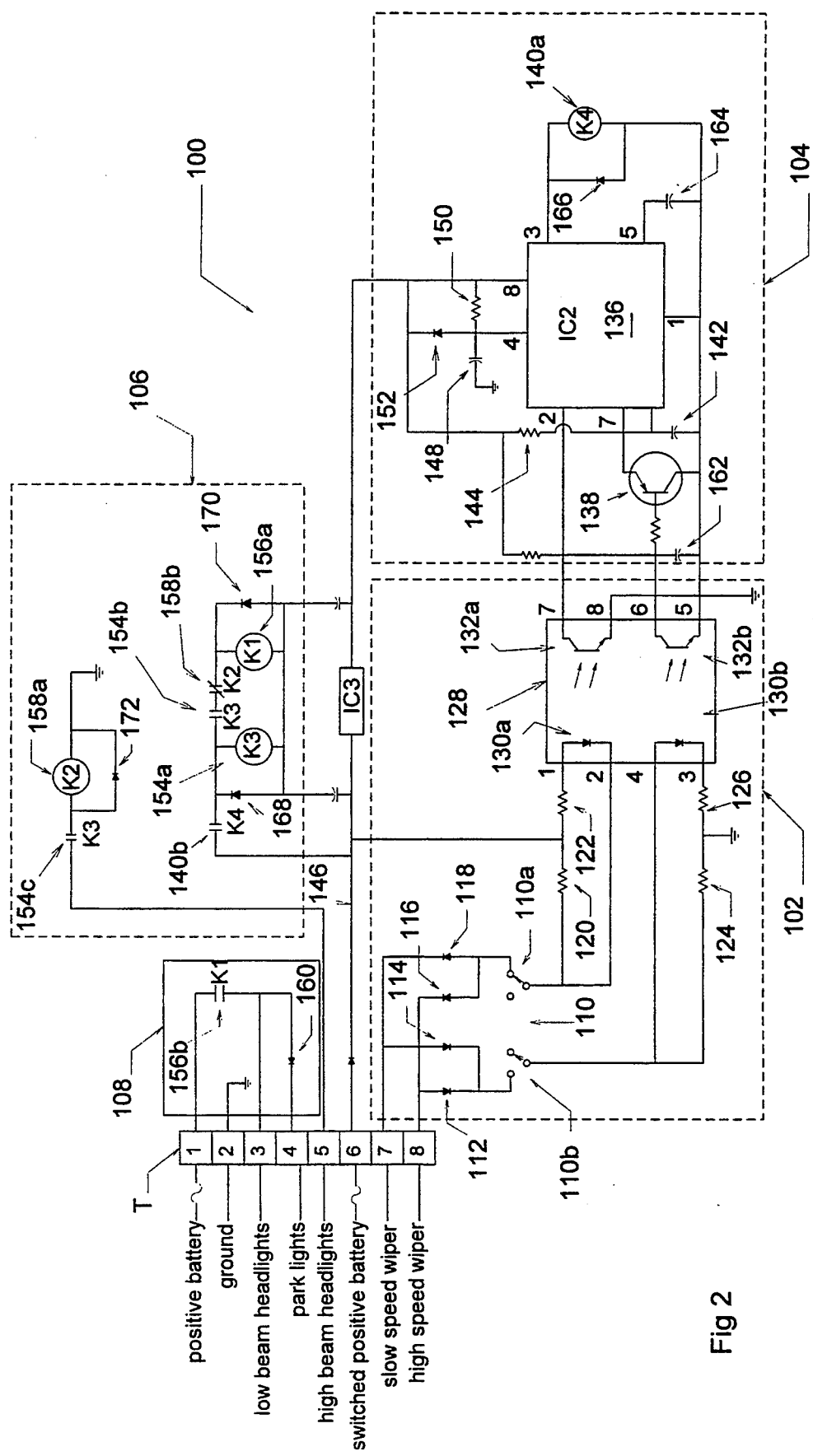

5,444,307

WIPER-ACTIVATED HEADLIGHT CIRCUIT

FIELD OF THE INVENTION

The present invention relates to a headlight wiper-circuit for a motor vehicle and more particularly, to a relay circuit for a vehicle that automatically actuates the vehicle's headlights whenever the vehicle's windshield wipers are operated.

BACKGROUND OF THE INVENTION

Adverse weather conditions, such as rain, snow and sleet can create hazardous driving conditions. These forms of precipitation not only reduce the vehicle's traction with the road, but can also drastically reduce the driver's visibility. Studies have shown that the use of headlights during adverse weather conditions can improve the driver's ability to see other vehicles on the road and reduce the number of accidents. For this reason, many states have mandated that the vehicle's headlights must be turned on whenever the windshield wipers are in use. Despite such legislation, many operators forget to turn on their headlights while using their windshield wipers.

In the past, wiper-activated headlight circuits have been proposed in which the headlights are turned on automatically whenever the windshield wipers are activated. Examples of wiper-activated headlight circuits are shown in the patents to Taccetta, et al., U.S. Pat. Nos. 5,187,383; Slotkowski et al., 5,182,502; Montemurro, 5,170,097; Benedict et al., 4,956,562; Cronk, 4,985,660; and Lesiak, 4,097,839.

The wiper-activated headlight circuits known in the past have some disadvantages. In many prior art circuits, the headlights are operated from power applied to the wiper motor. When the wipers are operated intermittently, the headlights flash on and off.

Another problem in some prior art circuits is that the headlights automatically turn off when the wipers are turned off. Thus, it is possible for the operator of the vehicle to inadvertently to turn off the headlights while operating the vehicle at nighttime.

Another problem with prior art circuit designs is that the low-beam headlights stay on when the high beams are normally turned on during wiper operation. The simultaneous operation of the low-beam headlights and the high-beam headlights is unnecessary and creates a needless drain on the vehicle's battery.

SUMMARY AND OBJECTS OF THE INVENTION

The present invention comprises a wiper-activated headlight circuit for automatically actuating the vehicle's low beam lamps whenever the windshield wipers are activated. The circuit comprises a headlight circuit and a wiper circuit connected to the vehicle's battery for actuating, respectively, the vehicle's headlights and wipers. A relay circuit is connected between the headlight circuit and the wiper circuit and is responsive to the detection of a voltage in the wiper circuit for actuating the headlights. The relay circuit includes a first relay for activating the low-beam lamp when the wiper switch is activated. A second interlocking relay is connected in series with the first relay and is normally closed. The second relay is energized by the high-beam lamps and functions as an interlock. When the second relay is energized, the first relay is deenergized to shut-off power to the low-beam lamps.

The first relay is connected to a delay circuit to allow continuous operation even when the windshield wipers are operated intermittently. The delay circuit includes a third relay which is triggered by each pulse from the windshield wiper motor. The third relay remains on for a predetermined time period which exceeds the delay period for the windshield wiper motor. The delay circuit is retriggered each time a pulse is received from the windshield wiper motor allowing continuous operation of the headlights as long as the windshield wiper is activated.

In another aspect of the present invention, the vehicle's instrument lights are disabled during operation of the windshield wipers unless the head lamps are turned on manually. This feature prevents inadvertent deactuation of the headlights when driving at night. As nighttime approaches, the operator of the vehicle will be reminded by the absence of instrument lights that the headlight switch has not been turned on.

Based on the foregoing, it is a primary object of the present invention to provide a wiper-activated headlight circuit for automatically actuating a vehicle's headlights when the windshield wipers are activated.

Another object of the present invention is to provide a wiper-activated headlight circuit that prevents the high beams and low beams from being turned on simultaneously during windshield wiper operation.

Still another object of the present invention is to provide a wiper-activated headlight circuit wherein the headlights will operate continuously even while the windshield wipers are operated intermittently.

Yet another object of the present invention is to provide a wiper activated headlight circuit having means to remind the vehicle operator to manually turn on the headlights when driving at night.

Another object of the present invention is to provide a wiper-activated headlight circuit which is relatively inexpensive to produce and is easily incorporated into existing motor vehicles.

Another object of the present invention is to provide a wiper-activated headlight circuit for motor vehicles having either common positive or common negative connections for the wiper windings.

Other objects and advantages of the present invention will become apparent and obvious from a study of the following description and the accompanying drawings which are merely illustrative of such invention.

BRIEF DESCRIPTION OF THE DRAWINGS

FIG. 2 is a detailed-electrical schematic showing the relay circuit of the present invention.

DETAILED DESCRIPTION OF THE INVENTION

Figure 1:
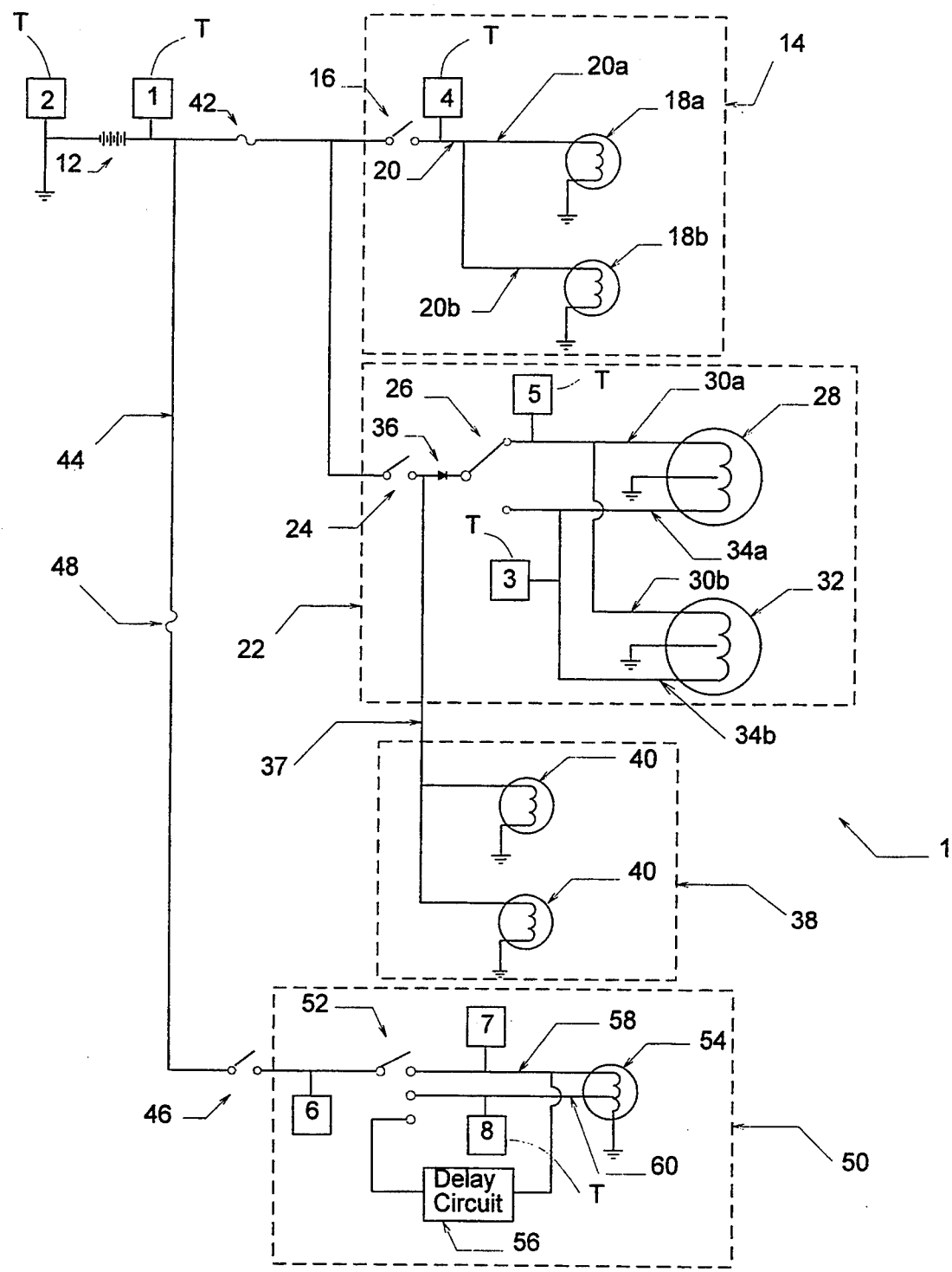
FIG. 1 is a electrical schematic of a headlight/wiper circuit for a motor vehicle.

Referring now to the drawings, and particularly to FIG. 1, the lighting and windshield wiper circuit is shown therein and indicated generally by the numeral 10. The circuit 10 includes a 12-volt battery 12 which is connected to a parking light circuit 14, a headlight circuit 22, an instrument light circuit 38, and a wiper circuit 50.

The parking light circuit 14 includes a parking light switch 16, front parking lights 18a and rear parking lights 15b. When the parking light switch 16 is closed, power is supplied to the parking lights 18a and 18b through line 20 to illuminate the parking lights 18a and 18b. The front parking lights 18a are powered through line 20a. The rear parking lights 18b are powered through line 20b. It will be appreciated that the parking light switch 16 and headlight switch 24 are both actuated by a single control within the vehicle. Thus, the parking lights 18a and 18b, will turn on whenever the headlights are turned on.

The headlight circuit 22 includes a headlight switch 24, a dimmer switch 26, and a pair of headlamps 28 and 32. Each headlamp 28 and 32 includes a high-beam filament and a low-beam filament. The high-beam filaments are powered through lines 30a and 30b respectively. The low-beam filaments are powered through lines 34a and 34b. When the headlight switch 22 is closed, power is supplied through the dimmer switch 26. The dimmer switch 26 alternately directs current through lines 30a and 30b, or lines 34a and 34b to illuminate the high beams or low beams respectively.

The instrument light circuit 38 is powered from the headlight circuit 22 through line 37. The instrument light circuit 38 includes a plurality of instrument lights 40 connected in parallel which are illuminated when the headlight switch 24 is closed. Thus, the instrument lamps 40 will be illuminated whenever the headlight circuit 22 is manually actuated. Diode 36 prevents the instrument lights 40 from being activated by the relay circuit 100 as will be hereinafter described.

The wiper circuit 50 is connected to the battery 12 through line 44 and ignition switch 46. A fuse 48 is disposed in line 44 to protect the ignition switch 46. The wiper circuit 50 includes a wiper switch 52 and a two-speed windshield wiper motor 54. The wiper circuit 50 also includes a delay circuit 56 for intermittent operation of the windshield wiper. The wiper switch 52 operates a two-speed wiper motor 54 with a time delay 56. The low speed terminal of the wiper motor 54 is connected to the wiper switch 52 through low speed line 58. The high speed terminal of the wiper motor is connected to switch 52 by the high speed line 60. The time delay 56 is connected between a third terminal of switch 52 and the low speed line 58.

When switch 52 is in a first position or low-speed position, power is supplied to the wiper motor through line 58 so that the motor operates at slow speed. When the wiper switch 52 is in a second position or high-speed position, power is supplied to the wiper motor through the high-speed line 60 so that the wiper motor operates at a high speed. When the wiper switch 52 is in a third position or intermittent position, the wiper motor 54 is operated at low speed but with a time delay. Since time delay circuits are well known to those skilled in the art, it will not be described herein in detail.

Referring now to FIG. 2, the relay circuit 100 of the present invention is shown. The relay circuit 100 is connected to the circuit 10 through a terminal block T having eight terminals (numbered 1-8). The connections between the circuit 10 and the terminal block T are illustrated in FIG. 1.

The relay circuit 100 includes generally a sensing circuit 102, and retriggerable delay circuit 104, a relay network 106, and an output power circuit 108. Power to the sensing circuit 102, delay circuit 104 and relay network 106 is provided through line 146 which is connected to terminal LT6. The voltage is regulated by a voltage regulator IC3.

The sensing circuit 102 is connected to the slow speed line 58 of circuit 10 through terminal T7 and to the high-speed line 60 through terminal T8. The sensing circuit 102 is connected through a double pole, double-throw switch 110 to an opto-isolator 128. Switch 110 includes a negative control position in which switch 110a is closed, and a positive control position in which switch 110b is closed. The negative control position is used for wiper circuits having a common positive connection to both the fast and slow windings of the wiper motor. The negative control position is used for circuits having a common positive connection to both fast and slow windings in which the negative voltage is controlled at the wiper switch. For vehicles controlling positive voltage of the wiper switch and having a common negative connection to both fast and slow windings, the positive control position is used. Switch 110 is shown in the negative control position in FIG. 2.

The sensing circuit 102 comprises a series of diodes 112, 114, 116 and 118. When the slow-speed wipers are turned on, current is supplied to the opto-isolator 128 through either diode 114 or 118 and resistors 120 and 122. When the fast speed wipers are turned on, current is supplied to the opto-isolator 128 through diodes 112 or 116 and resistors 124 and 126.

The opto-isolator 128 comprises an integrated circuit including a pair of light-emitting diodes (LEDs) 130a and 130b and a pair of phototransitors 132a and 132b. When switch 110 is in a negative control system, current will be applied to the LED 130a. Similarly, when the switch 110 is in a positive control position, the current is applied to LED 130b. When either of the LEDs 130a or 130b are turned on, the light is detected by its corresponding phototransistor 132a or 132b and a negative trigger pulse is passed to the delay circuit 104.

The delay circuit 104 includes an integrated timer circuit 136, a transistor 138 for retriggering the timer circuit 136, and a relay solenoid 140a which is activated by the timer circuit 136. A timing capacitor 142 and timing resistor 144 are used to set the period of the delay. When a negative trigger pulse is received by the delay circuit 104, the output of the timer circuit will go high and the timing capacitor 42 will begin to charge through the timing resistor 144. When the delay circuit 136 goes high, solenoid 140 is energized to enable the relay network 106 as will be hereinafter described.

When the ignition switch 46 is turned on, power is supplied to the delay circuit 104 through power line 146. When the power is turned on, pin 4 (the reset pin for IC2) is held low momentarily until capacitor 148 charges through resistor 150. This prevents the headlights from being activated inadvertently during power up. Diode 152 provides for a rapid discharge of the capacitor 148 when power is removed so that the reset function is immediately ready for the next power up.

The relay network is energized by the delay circuit 104. The relay network includes relay solenoids 154a, 156a, and 158a, and relay switches 140b, 154d, 154c, and 158b. The relay network 106 controls the output power circuit 108 which includes a relay switch 156b and diode 160.

Relay switch 140b in the relay network 106 is actuated by the relay solenoid 140a. When relay switch 140b is closed, relay solenoid 154a is energized, closing relay switches 154b and 154c. When relay switch 154b is closed, relay solenoid 156a is energized through relay switch 158b, which is normally closed. When relay solenoid 156a is energized, relay switch 156b closes the circuit between terminal T1 and terminals T3 and T4 to apply power to the low-beam lamps and the parking lights.

When the high-beam lamps are manually turned on, relay solenoid 158a will energize through terminal T5 and the closed switch 154c. When energized, relay solenoid 158a will open the relay switch 158b in series with the relay solenoid 156a, turning the low-beam lamps off. Diode 160 in the output power circuit 108 prevents the low-beam headlights from being powered off the parking lights when the high beams are on.

The delay circuit 104 is designed to latch on to each pulse from the wiper motor and remain on for a predetermined time period. When the voltage at pin 6 of the timer 136 reaches two-thirds of the voltage at pin 8, the output of the timer 136 at pin 3 will go low and the timing capacitor 142 will be discharged. When the output of the timer 136 goes low, relay solenoid 140a is deenergized which disables the relay network 106 and turns off the headlights.

To allow the headlights to remain on during delay wiper operation, the delay circuit 104 includes a retriggering device. In the present invention, transistor 138 functions as the retriggering device. Each time a trigger pulse is received from the opto-isolator 128, the transistor 138 discharges the timing capacitor 142 to zero volts to reset the timing period. Since the maximum delay on most intermittent windshield wipers is approximately 20 seconds, the delay period for the delay circuit 136 should be approximately 35 to 45 seconds. The timing period is set by the values of the timing capacitor 142 and timing resistor 144.

The present invention is also designed to prevent operation of the instrument lights 40 unless the headlight switch 24 is turned on manually. By suppressing power to the instrument lights, the driver will be reminded of the need to manually turn on the headlights when driving at night. To accomplish this, a diode 36 is placed in the headlight circuit 10 so as to prevent the instrument lights 38 from being activated by the relay circuit 100.

Capacitors 162 and 164 in the delay circuit 104 are used for stabilizing the circuit. Diodes 166 and in the delay circuit 104, and diodes 168, 170 and 172 in the relay network 106 provided discharge paths for the coils of the relay solenoids 140a, 154a, 156a, and 158a, respectively.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A circuit for automatically actuating the headlights of a motor vehicle upon actuation of the vehicle's windshield wiper comprising:
   (a) a headlight circuit operatively connecting the headlights to a power source, the headlight circuit including a headlight switch for turning the headlights on and off, and a dimmer switch for selectively activating the high-beam lamps and low-beam lamps;
   (b) a wiper circuit operatively connecting the vehicle's wipers to a power source for powering the vehicle's windshield wipers, said windshield wiper circuit including a wiper switch for turning on said windshield wipers;
   (c) a relay circuit operatively connecting said headlight circuit and said windshield wiper circuit for actuating the low beam lamps when the windshield wipers are activated, said relay circuit including interlocking means for deactivating said low-beam lamps upon manual actuation of the high-beam lamps.

2. The circuit of claim 1 further including an instrument lamp circuit powered from said headlight circuit including one or more instrument lamps and means to prevent actuation of said instrument lamp circuit by said relay circuit when said headlight circuit is powered by said relay circuit, said means also to permit actuation of said instrument lamp circuit by said power source when said headlights are manually turned on with said headlight switch.

3. The circuit of claim 1 wherein said relay circuit includes a sensing circuit for sensing a voltage in said wiper circuit; a retriggerable delay circuit operably connected to the sensing circuit for generating an output signal that remains on for a predetermined time period after said voltage signal is sensed by said sensing circuit; and a first relay responsive to the retriggerable delay circuit for activating the low-beam headlamps.

4. The circuit of claim 3 wherein said interlocking means comprises a second relay responsive to the actuation of the high-beam lamps for deactivating said first relay.

5. The circuit according to claim 4 wherein said sensing circuit includes a polarity switch for changing the polarity of the sensing circuit between the negative detection mode and a positive detection mode.

6. A circuit for automatically actuating the headlights of a motor vehicle upon actuation of the vehicle's windshield wiper comprising:
   (a) a headlight circuit operatively connecting the headlights to a power source, the headlight circuit including a headlight switch for turning the headlights on and off, and a dimmer switch for selectively activating the high-beam lamps and low-beam lamps;
   (b) a wiper circuit operatively connecting the vehicle's wipers to a power source for powering the vehicle's windshield wipers, said windshield wiper circuit including a wiper switch for turning on said windshield wipers;
   (c) a relay circuit operatively connecting said headlight circuit and said windshield wiper circuit for actuating the low-beam lamps when the windshield wipers are activated; and
   d) an instrument lamp circuit powered from said headlight circuit including one or more instrument lamps and means to prevent actuation of said instrument lamp circuit by said relay circuit when said headlight circuit is powered by said relay circuit.

7. A circuit for automatically actuating the headlights of a motor vehicle upon actuation of the vehicle's windshield wiper comprising:
   (a) a headlight circuit operatively connecting the headlights to a power source, the headlight circuit including a headlight switch for turning the headlights on and off, and a dimmer switch for selectively activating the high-beam lamps and low-beam lamps;

(b) a windshield wiper circuit operatively connecting the vehicle's wipers to a power source for powering the vehicle's windshield wipers, said windshield wiper circuit including a wiper switch for turning on said windshield wipers;

(c) a relay circuit operatively connecting said headlight circuit and said windshield wiper circuit for actuating the low-beam lamps when the windshield wipers are activated; and (d) wherein said relay circuit includes a sensing circuit for sensing a voltage in said wiper circuit; a retriggerable delay circuit operably connected to the sensing circuit for generating an output signal that remains on for a predetermined time period after said voltage signal is sensed by said sensing circuit; and a first relay responsive to the retriggerable delay circuit for activating the low-beam headlamps.

8. The circuit of claim 7 wherein said relay circuit also includes interlocking means for deactivating said low-beam lamps upon manual actuation of the high-beam lamps.

9. The circuit according to claim 8 wherein said sensing circuit includes a polarity switch for changing the polarity of the sensing circuit between a negative detection mode and a positive detection mode.

10. The circuit of claim 7, further including an instrument lamp circuit that is powered from said headlight circuit and that includes one or more instrument lamps and means to prevent actuation of said instrument lamp circuit by said relay circuit when said headlight circuit is powered by said relay circuit, said means also to permit actuation of said instrument lamp circuit by said power source when said headlights are manually turned on with said headlight switch.

* * * * *